US006494284B1

(12) United States Patent
Cooper (10) Patent No.: US 6,494,284 B1
(45) Date of Patent: Dec. 17, 2002

(54) SEAT ARRANGEMENT FOR A VEHICLE HAVING AN ACTUATABLE OCCUPANT PROTECTION DEVICE

(75) Inventor: Stephen R. W. Cooper, Fowlerville, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/705,495

(22) Filed: Nov. 3, 2000

(51) Int. Cl.$^7$ ................................................ B60K 28/14
(52) U.S. Cl. ........................ 180/282; 280/735; 701/45
(58) Field of Search ...................... 180/272, 3, 282; 280/735, 734; 701/45

(56) References Cited

U.S. PATENT DOCUMENTS

| | | | |
|---|---|---|---|
| 5,118,134 A | 6/1992 | Mattes et al. | |
| 5,232,243 A | 8/1993 | Blackburn et al. | |
| 5,494,311 A | 2/1996 | Blackburn et al. | |
| 5,498,028 A * | 3/1996 | Carlin et al. ................. | 280/735 |
| 5,515,933 A | 5/1996 | Meyer et al. | |
| 5,573,269 A | 11/1996 | Gentry et al. | |
| 5,587,906 A * | 12/1996 | McIver et al. ............... | 180/282 |
| 5,624,132 A * | 4/1997 | Blackburn et al. .......... | 280/735 |
| 5,626,359 A | 5/1997 | Steffens, Jr. et al. | |
| 5,707,076 A | 1/1998 | Takahashi | |
| 5,739,757 A * | 4/1998 | Gioutsos ..................... | 340/667 |
| 5,749,059 A * | 5/1998 | Walton ........................ | 280/735 |
| 5,804,887 A | 9/1998 | Holzapfel et al. | |
| 5,848,661 A * | 12/1998 | Fu ............................... | 180/273 |
| 5,877,677 A * | 3/1999 | Fleming et al. ............. | 340/436 |
| 5,893,582 A * | 4/1999 | Allen et al. .................. | 280/735 |
| 5,918,696 A * | 7/1999 | VanVoorhies ............... | 180/273 |
| 5,957,491 A * | 9/1999 | Cech et al. .................. | 177/209 |
| 5,967,549 A * | 10/1999 | Allen et al. .................. | 280/735 |
| 5,975,568 A * | 11/1999 | Speckhart et al. .......... | 280/735 |
| 6,040,532 A * | 3/2000 | Munch ......................... | 177/144 |
| 6,070,115 A * | 5/2000 | Oestreicher et al. ........ | 280/735 |
| 6,084,314 A | 7/2000 | McCurdy | |
| 6,129,168 A * | 10/2000 | Lotito et al. ................. | 180/273 |
| 6,243,634 B1 | 6/2001 | Oestreicher et al. | |
| 6,250,671 B1 * | 6/2001 | Osmer et al. ................ | 180/271 |
| 6,259,167 B1 * | 7/2001 | Norton ........................ | 307/10.1 |
| 6,282,473 B1 * | 8/2001 | Steffens, Jr. ................ | 180/272 |
| 6,341,252 B1 * | 1/2002 | Foo et al. .................... | 180/268 |

OTHER PUBLICATIONS

U.S. Cooper et al. patent application Ser. No. 09/687,707, filed Oct. 13, 2000 entitled Vehicle Crash Determination Arrangement and Method, Utilizing Center of Gravity, for an Occupant Protection System, Attorney Docket No. TRW(TE)4402.

* cited by examiner

Primary Examiner—Paul N. Dickson
Assistant Examiner—Deanna Draper
(74) Attorney, Agent, or Firm—Tarolli, Sundheim, Covell, Tummino & Szabo L.L.P.

(57) ABSTRACT

An arrangement (10), for a vehicle (12) that has an actuatable occupant protection device (14), includes a vehicle seat (16) for a vehicle occupant (22). The arrangement (10) includes sensors (42 and 44) located within the seat (16) for sensing a characteristic that is indicative of a condition for which the protection device (14) is to be actuated. A controller (32) of the arrangement (10) is located within the seat (16) and processes sensory information from the sensors (42 and 44) to determine the occurrence of the condition for which the protection device (14) is to be actuated. A signal (36) indicative of the determination is output from the controller (32).

15 Claims, 5 Drawing Sheets

SEAT ARRANGEMENT FOR A VEHICLE HAVING AN ACTUATABLE OCCUPANT PROTECTION DEVICE

TECHNICAL FIELD

The present invention relates to vehicle occupant protection systems.

BACKGROUND OF THE INVENTION

Occupant protection systems for use in vehicles are known in the art. One type of protection system includes an actuatable inflatable restraint module, which has an inflatable restraint that is commonly referred to as an air bag. A controller determines whether the air bag module is to be actuated to inflate the air bag within a vehicle occupant compartment. The air bag module is actuated by the controller upon the occurrence of a predetermined condition for which a vehicle occupant is to be cushioned by the air bag. For example, a sensor senses a vehicle condition indicative of a vehicle crash condition and, in response thereto, the air bag module is actuated.

In certain circumstances, even if the predetermined crash condition occurs, it may be preferable to refrain from actuating the air bag module (i.e., prevent inflation of the air bag). Specifically, if the occupant associated with the air bag module is at a location such that deploying the air bag will not enhance protection of the occupant, actuation of the air bag module does not occur.

One example in which an occupant is located such that deploying the air bag will not enhance protection of the occupant is when the occupant is very near the air bag module. Typically, an occupant who is very near the air bag module is referred to as being within an occupant out-of-position zone. Actuation of the air bag module for an occupant who is within the occupant out-of-position zone will not enhance protection of the occupant.

A protection system that provides for control of a protection system device (e.g., an air bag module) in response to a sensed occupant condition (e.g., occupant type and occupant location) is commonly referred to as a "smart" protection system. Smart protection systems control actuation of the associated protection system device (e.g., the air bag module), and may also control a deployment profile (e.g., timing and manner of deployment) of the device. For example, smart control of an air bag module can include control of the amount of inflation fluid used to inflate the air bag in response to sensed occupant location.

Control of such smart protection systems is associated with a rather larger volume of information processing and decision-making. In other words, a processor algorithm within smart protection systems can be rather complex. For example, a decision to deploy an air bag can depend on a plurality of factors such as crash severity, occupant size, occupant location, and occupant type (i.e., a large adult versus a child in an infant seat). In a staged, multilevel deployment system, the degree of deployment can also depend upon plurality of factors such as the above mentioned factors.

The information processed within a smart restraint system that is associated with the plurality of factors includes sensory signal information from several sources (e.g., sensors or sensor arrangements) at several locations. Examples of the variety of placed sensors that are used to provide sensory information in smart restraint systems include: crash deceleration sensors and crash safing sensors on a vehicle chassis, ranging sensors in an instrument panel and/or in a headliner, weight sensors in a seat or under a seat, and buckle sensors in a seat belt clasp.

Such sophisticated occupant protection systems have associated costs in terms of time and money to develop, manufacture, and install. First, the multiple sensor locations require an occupant protection system vendor, and particularly occupant sensing system personnel of the vendor, to interact with multiple responsible groups within a vehicle manufacturer. Examples of the groups with which an occupant protection system vendor must typically interact include an instrument panel group for panel mounted sensors, a headliner/overhead console group for overhead sensors, a seat group for seat mounted sensors, a chassis/body group for crash sensors, an styling/interior groups for many sensors and components, and so on. In terms of time and cost, an occupant protection system vendor has a considerable burden to work with and qualify an occupant protection system with all such groups.

SUMMARY OF THE INVENTION

In accordance with one aspect, the present invention provides an arrangement for a vehicle having an actuatable occupant protection device. The arrangement includes a vehicle seat for a vehicle occupant. Sensor means of the arrangement is located within the seat and senses a characteristic that is indicative of a condition for which the protection device is to be actuated. Processor means of the arrangement is located within the seat. The processor means processes sensory information from the sensor means to determine the occurrence of the condition for which the protection device is to be actuated and outputs a signal indicative of the determination.

In accordance with another aspect, the present invention provides an arrangement for a vehicle having an actuatable occupant protection device. The arrangement includes a vehicle seat for a vehicle occupant. The arrangement includes all components, which are contained within the seat, necessary for determining the occurrence of a vehicle condition for which the occupant is to be protected by the protection device and for controlling actuation of the occupant protection device.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
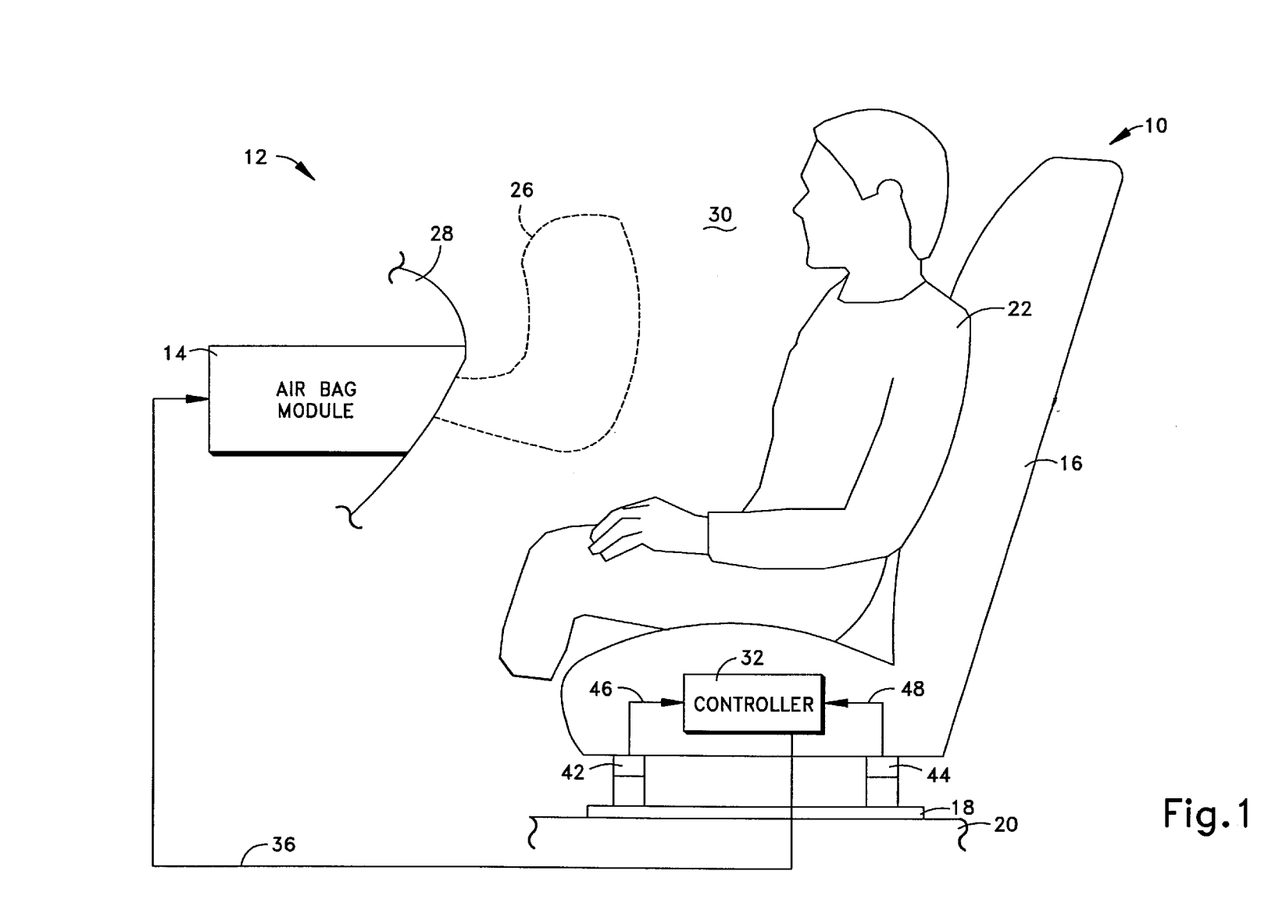
FIG. 1 is a schematic illustration of an arrangement in accordance with the present invention, and an associated vehicle.

An arrangement 10 in accordance with the present invention and an associated vehicle 12 (partially shown) are schematically illustrated in FIG. 1. The vehicle 12 has an occupant protection device 14 that is associated with a vehicle seat 16 of the arrangement 10. A mounting base 18 of the seat 16 secures the seat to a chassis 20 of the vehicle 12. In the illustrated example, the seat 16 of the arrangement 10 is for an occupant 22 who is a front seat passenger. Thus, the occupant protection device 14 is for the front seat passenger.

For the purpose of illustration and not for the purpose of limitation, the protection device 14 is shown as an air bag module 14. The module 14 includes an inflatable cushion restraint 26 that is commonly referred to as an air bag 26. The air bag 26 is stored in a folded condition within the module 14 in a manner well known in the art.

A source (not shown) of inflation fluid (e.g., nitrogen gas) is provided within the air bag module 14 to inflate the associated air bag 26. The source of inflation fluid is commonly referred to as an inflator, and includes a stored quantity of pressurized inflation fluid and/or an inflation fluid generating material. The inflator has an associated igniter (e.g., a pyrotechnic squib) that is electrically activated to initiate flow of the inflation fluid from the inflator. The air bag module 14 is located within an instrument panel 28 of the vehicle 12. The flow of inflation fluid to the air bag 26 inflates the air bag within an occupant compartment 30 of the vehicle 12, as will be appreciated by a person of ordinary skill in the art.

It is to be understood that other and/or different occupant protection device(s) may be utilized, the device(s) may be located elsewhere with the vehicle 12, and may be associated with other vehicle seats that are in accordance with the present invention. Examples of different/additional actuatable protection system devices include a driver side air bag module, a knee bolster module, a seat belt lock, a seat belt pretensioner module, and a D-ring adjuster module. A person of ordinary skill in the art will appreciate that the actuatable protection system devices may also have adjustable actuation variable(s). Such adjustable variables include deployment timing, air bag dynamic profile, pressure, etc.

The arrangement 10 includes a controller 32 that determines the occurrence of a vehicle crash condition using sensed occupant-based information, and that provides control signal(s) 36 to the air bag module 14. Specifically, the controller 32 provides the signal 36 to the air bag module 14 to cause actuation of the air bag module. A suitable power connection (not shown) extends from a vehicle power supply (e.g., a battery, not shown) to the controller 32. In one example, the controller 32 includes a microcomputer with a processor that performs an algorithm. In accordance with the present invention, the controller 32 is located within the seat 16.

Input sources for the controller 32 include a plurality (e.g., two) of weight sensors 42 and 44. Each of the weight sensors 42 and 44 is located beneath a portion of the seat 16. The first weight sensor 42 is located beneath a forward portion of the seat 16 and is referred to as a front weight sensor 42. The second weight sensor 44 is located beneath a rearward portion of the seat and is referred to as the rear weight sensor 44. The weight sensors 42 and 44 are schematically shown in FIG. 1 as being at an upper end of the mounting base 18 of the seat 16. However, it to be understood that the weight sensors may be located in other parts (e.g., within a lower cushion part) of the seat 16. The weight sensors 42 and 44 output signals 46 and 48, respectively, that are indicative of sensed weight values.

Figure 2:
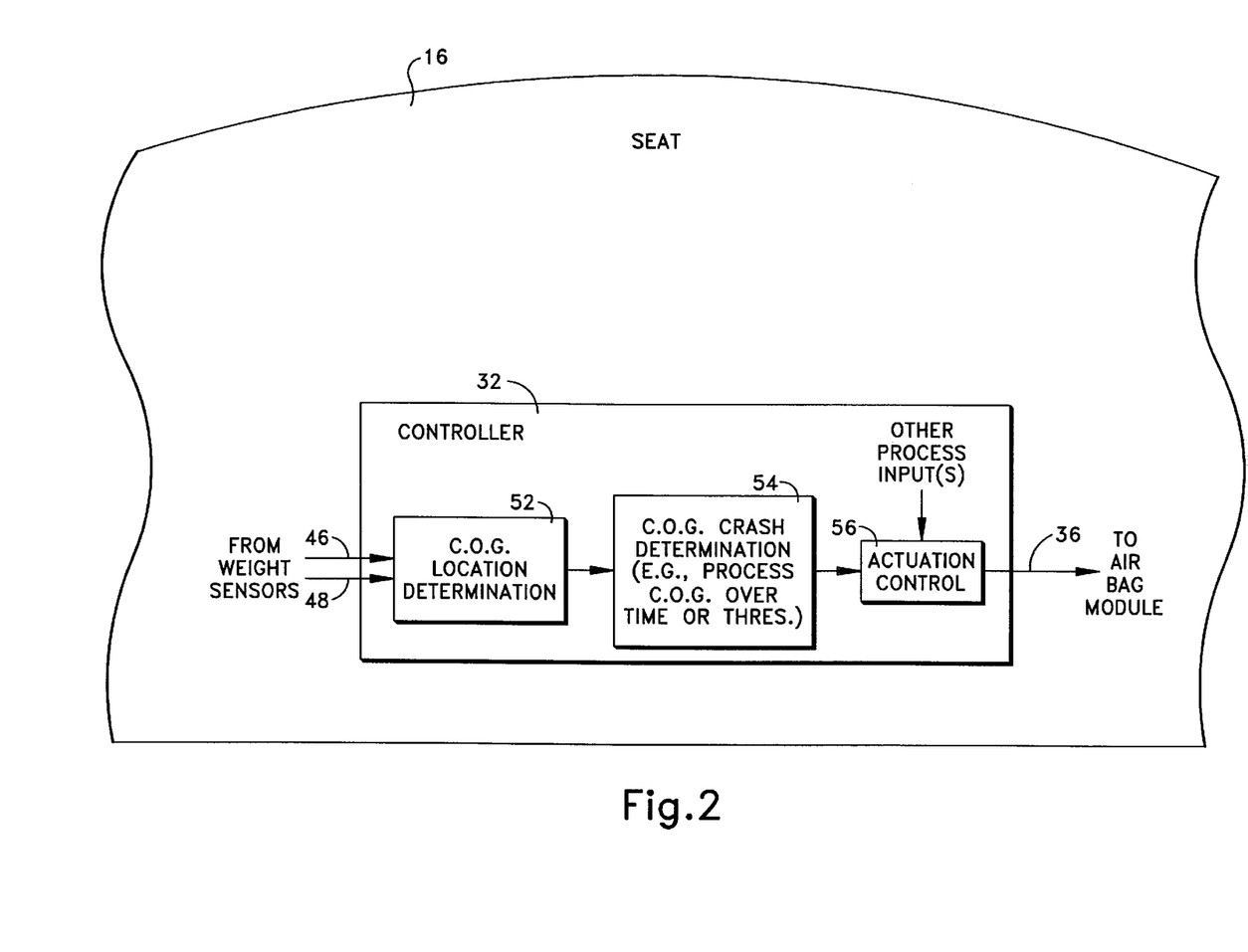
FIG. 2 is a function block diagram of a controller shown in FIG. 1 that is located within a seat in accordance with the present invention.

The controller 32 (FIG. 2) includes portions 52 and 54 that utilize the signals 46 and 48 provided by the weight sensors 42 and 44 to determine the occurrence of a vehicle condition (e.g., a vehicle crash condition) for which the occupant 22 (FIG. 1) is to be protected via actuation of the air bag module 14. The controller 32 also includes a portion 56 (FIG. 2) that controls actuation of the air bag module 14 in response to the determination of the occurrence of the vehicle condition for which the occupant 22 is to be protected and in response to other process inputs, if any. Thus, it is to be appreciated that all of the components (i.e., the controller 32 and the weight sensors 42 and 44) needed to determine and perform actuation control of the air bag module 14 are located within the seat 16. It is also to be appreciated that the invention is not limited to the illustrated example of using weight sensors to determine the occurrence of a vehicle condition (e.g., a vehicle crash condition) for which the occupant 22 is to be protected via actuation of the air bag module 14.

A minimal number of control/sensory signal connections extend between the components located within the seat 16 and components located outside of the seat. In the illustrated example of FIG. 1, only the single control signal line extends from the controller 32, which is located within the seat 16, to the air bag module 14, which is located outside of the seat. With all of the components (i.e., the controller 32 and the weight sensors 42 and 44) needed to determine actuation control of the air bag module 14 being located within the seat 16, the overall volume and length of wiring connections is reduced compared to many conventional systems. Also, the number of vehicle component groups of a vehicle manufacture that must cooperate regarding the occupant protection system is minimized.

An occupant protection system utilizing the arrangement 10 in accordance with the present invention is easier to install in a vehicle compared to many conventional occupant protection systems. Also, an occupant protection system utilizing the arrangement 10 in accordance with the present invention is easier to qualify to a vehicle manufacture compared to many conventional occupant protection systems. In particular, the system complexity that is presented to the vehicle manufacturer is considerably reduced.

Turing to specifics of operation of the illustrated example, the controller 32 determines the occurrence of a vehicle crash condition via monitoring a center of gravity (C.O.G.) of the occupant 22 and at least a portion of the seat 16 (herein after referred to as the combined C.O.G.). In order to accomplish this function, the first portion 52 (FIG. 2) of the controller 32 within the arrangement 10 determines the location of the combined C.O.G., and the second portion 54 of the controller determines whether movement of the combined C.O.G. is indicative of a vehicle crash condition. Hereinafter, the portion 52 of the controller 32 that determines the combined C.O.G. is referred to as the C.O.G. location determination portion 52, and the portion 54 of the controller that determines whether movement of the combined C.O.G. is indicative of a vehicle crash condition is referred to as a C.O.G. crash determination portion 54.

The sampling of the signals 46 and 48, the determination of the location of the combined C.O.G., and the determination of whether movement of the combined C.O.G. is indicative of a vehicle crash condition are all done at relatively short intervals to permit timely determinations. For example, the sampling of the signals 46 and 48, and the determination of the location of the combined C.O.G. are done at a frequency of 1000 or more times per second.

Attention is now directed to applied forces and reactions of the occupant 22 (FIG. 1) and the seat 16 that permit a crash determination to be made. In a static condition (i.e., no external acceleration force, except for gravity, acting upon the occupant 22 and the seat 16) the sum of the weight values from the two weight sensors 42 and 44 is equal to the weight of the occupant 22 and the portion of the seat 16 above the weight sensors. The division of the total weight between the two weight sensors 42 and 44 is dependent upon the location of a static center of mass (C.O.M.) of the occupant 22 and the seat 16.

Upon the onset of a frontal vehicle crash, the occupant 22 is urged forward relative to the vehicle 12 and the seat 16 due to inertia (perceived by the occupant as acceleration). The combined C.O.G. of the occupant 22 and the seat 16 is effected by the sudden relative acceleration (i.e., vehicle deceleration) force that is perceived by the occupant and the seat due to a frontal vehicle crash. The combined C.O.G. changes significantly and quickly due to the sudden relative acceleration force.

Figure 3:
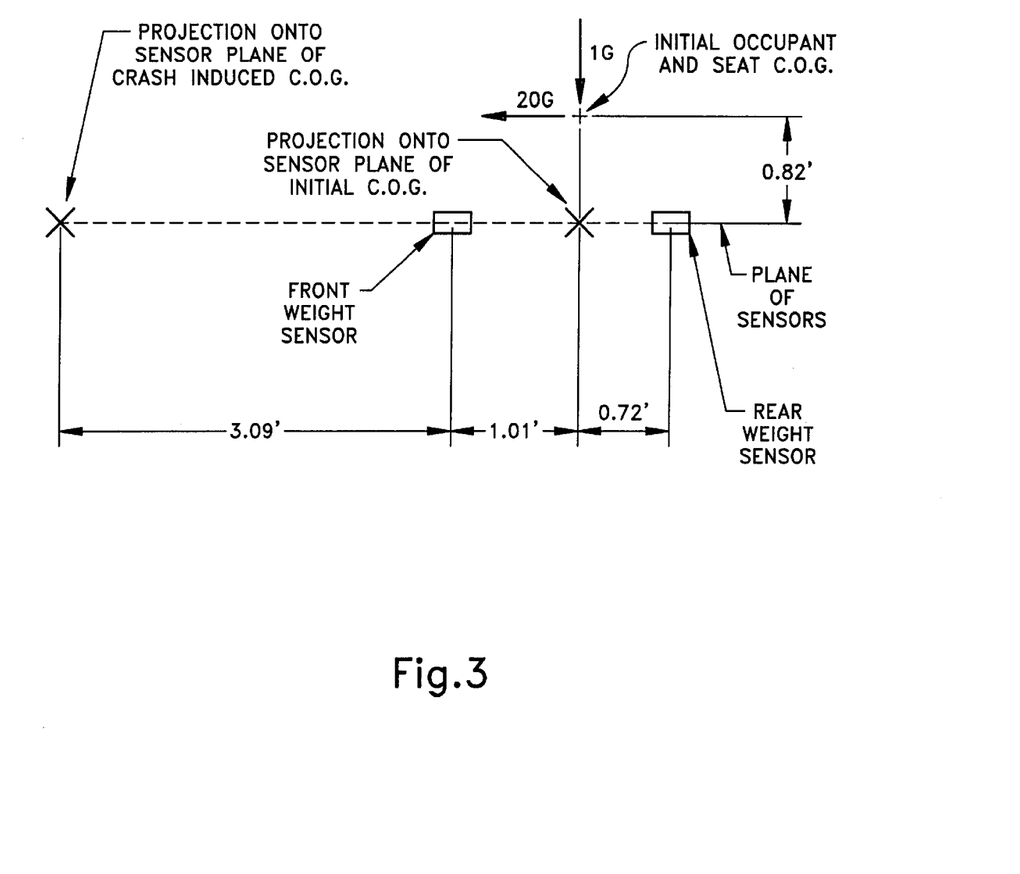
FIG. 3 is a graphical representation showing displacement of occupant and seat center of gravity upon occurrence of the vehicle crash condition.

Consider the example of FIG. 3, in which the initial location of the combined C.O.G. is shown with respect to the weight sensors 42 and 44. The initial combined C.O.G. is located 1.01 feet behind the front weight sensor 42 and is located 0.72 feet in front of the rear weight sensor 44. This can easily be understood by projecting the location of the initial combined C.O.G. onto the horizontal plane that contains the weight sensors 42 and 44. The initial combined C.O.G. is located 0.82 feet above the plane of the weight sensors 42 and 44. Assuming a 175 lb. combined weight for the occupant 22 and the seat 16 and static conditions, the weight values sensed by the weight sensors 42 and 44 could be determined as:

$$0 = 175*1.01 - w_r(1.01+0.72)$$

$w_r = 102.167$ lbs $w_f = 175 - w_r$ $w_f = 72.833$ lbs.

where $w_f$ (72.833 lbs.) is the weight portion exerted on the front weight sensor 42 and $w_r$ (102.167 lbs.) is the weight portion exerted on the rear weight sensor 44. It is to be noted that the static requirement of total torque equaling zero is used to solve for the weight portions, and torque is calculated relative to the front weight sensor 42.

Now assume that a 20 G crash deceleration occurs. In the frame of the seat 16, this will appear as a 20 times total weight force applied in the forward direction (from right to left in FIG. 3) to the combined C.O.M. Again, setting torque =0, the front and rear weight portions and the new location of the combined C.O.G. (i.e., the crash-induced C.O.G. location) are solved. However, it is to be noted that the human body is not rigid and static conditions of the human body do not prevail. The torso of the human body is hinged relative to the lower body, and the arms are hinged relative to the torso.

For purposes of determining a qualitative as opposed to a quantitative effect, it will be assumed that the effect of the rotating torso is to lessen the amount of torque that the occupant can exert on the seat (depending on how or whether they are belted, here it is assumed that the occupant is unbelted). This will be approximated by reducing the effective C.O.M. moment arm by one-half, and by reducing the total weight force for the lateral 20 G component by one-half. In real cases this factor could be larger or smaller depending on body type, use of seat belt and any stiffening reactions by a real occupant.

With these assumptions, the weight forces and location of the crash-induced C.O.G. are calculated as follows:

$$0 = \frac{20}{2}*175*\frac{0.82}{2} + 175*1.01 - w_r(1.01+0.72)$$

$w_r = -312.57$ lbs $w_f = 175 - w_r$ $w_f = 487.57$ lbs $$C.O.G. = \frac{(1.01+0.72)w_r}{w_r + w_f}$$

$C.O.G. = -3.09$ ft.

where the location of the crash-induced C.O.G. is given as a distance relative to the front weight sensor 42, and is seen to be 3.09 feet in front of the front weight sensor 42 in FIG. 3. The C.O.G. location determination portion 52 of the controller 32 repeatedly performs such calculations to constantly update the location of the combined C.O.G. Clearly, a large crash deceleration can have a large effect on the location of the combined C.O.G. as determined from the weight sensor readings.

Crash deceleration causes the greatest amount of change of the location of the combined C.O.G. and causes the quickest rate of change of location of the combined C.O.G. The C.O.G. crash determination portion 54 of the controller 32 makes one or more determinations about the change of location of the combined C.O.G., and makes a determination as to whether the vehicle is in a crash condition based upon the C.O.G. determination(s). Specifically, the C.O.G. crash determination portion 54 determines if the displacement of the location of the combined C.O.G. exceeds a threshold distance value and/or determines if the rate of change of the location of the combined C.O.G. exceeds a threshold rate of change value.

Figure 4:
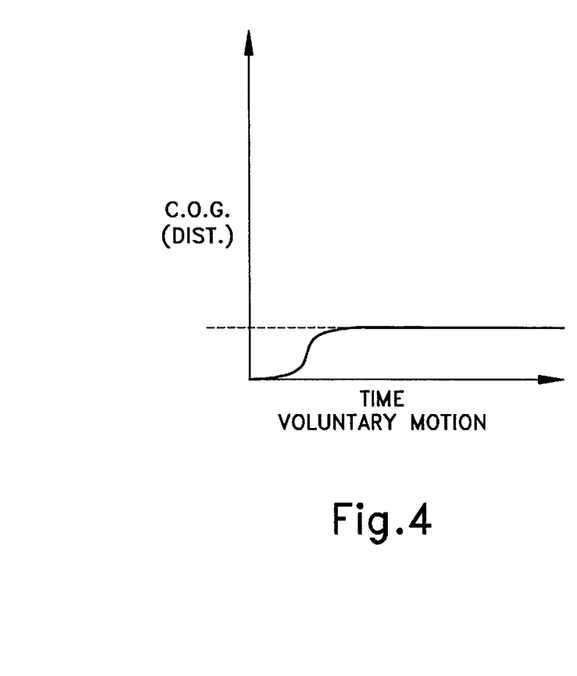
FIG. 4 is a graph showing displacement of occupant and seat center of gravity induced by occupant voluntary movement.
Figure 5:
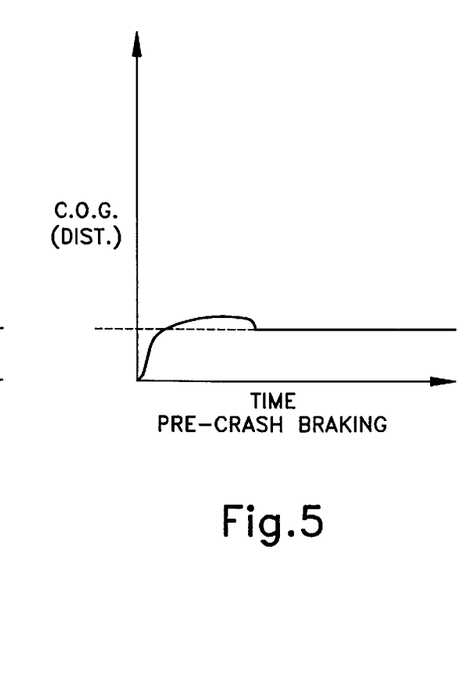
FIG. 5 is similar to FIG. 4, but the displacement is induced by pre-crash vehicle braking.
Figure 6:
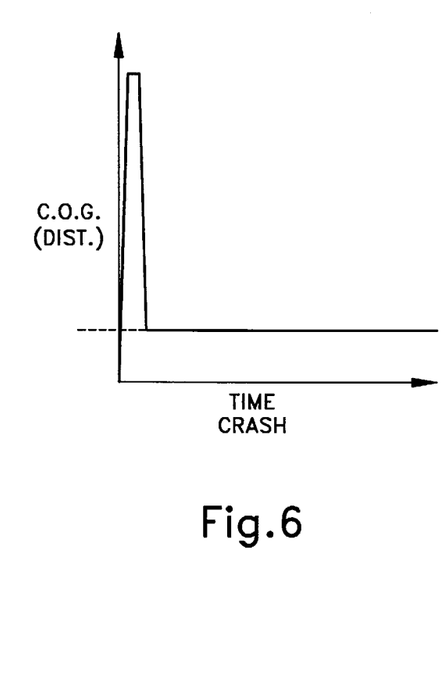
FIG. 6 is similar to FIG. 4, but the displacement is induced by the vehicle crash condition.

As illustrations of how the change of the location of the combined C.O.G. differs for various situations, attention is directed to FIGS. 4–6.

FIG. 4 illustrates the displacement forward (i.e., the change of location from the initial location) of the combined C.O.G. due to voluntary forward movement of the occupant 22. It is to be noted that the occupant 22 has little mechanism to exert a forward torque on the seat 16, and thus can primarily change the combined C.O.G. only to the extent that the occupant can move his/her own C.O.M. There is a limit to the extent that the occupant 22 can shift his/her own C.O.M. and remain on the seat 16. The horizontal dash lines in FIGS. 4–6 identify this maximum shift of the C.O.G. that can be obtained via voluntary occupant movement. It can be seen in FIG. 4 that the amount of distance change achieved by the voluntary movement of the occupant rises only to this maximum distance amount.

Also, in order to accomplish the voluntary movement, the occupant has to accelerate his/her own body mass, and build up velocity to accomplish the voluntary movement. This results in a relatively low rate of change (i.e., slope of the increasing portion of the plot of FIG. 6) of the location of the combined C.O.G.

FIG. 5 illustrates the displacement forward (i.e., the change of location from the initial location) of the combined C.O.G. due to pre-crash braking. Pre-crash braking typically causes a 1 G or less relatively forward force to be exerted on the occupant 22, and can cause a certain amount of rapid forward shift in the combined C.O.G. It the occupant 22 is unrestrained and unbraced and given a sufficiently long braking time, the occupant could easily be far forward when the braking ceases and the location of the combined C.O.G. would be similar to the location achievable via voluntary movement.

However, the signature for a pre-crash braking event is a quicker forward displacement of the combined C.O.G., as compared to displacement of the combined C.O.G. due to voluntary movement. During the braking, the forward displacement of the combined C.O.G. continues to increase as the occupant 22 moves far forward. If the braking continues with the occupant 22 far forward, the forward displacement of the combined C.O.G. will rise somewhat above the maximum that is achieved by voluntary occupant motion. As soon as the braking is removed, the displacement of the combined C.O.G. drops to the level of displacement achieved by voluntary occupant motion.

FIG. 6 illustrates the forward displacement (i.e., the change of location from the initial location) of the combined C.O.G. due to a vehicle crash. Upon the occurrence of the crash, a large, instantaneous forward torque is perceived by the weight sensors 42 and 44, and causes a large forward shift of the combined C.O.G. The shift of the combined C.O.G. is much further than what could be accomplished by forward shifting of the occupant C.O.M. (i.e., occupant movement). When the crash ends, the location of the combined C.O.G. reverts to the maximum that can be achieved for an occupant that is far forward (this assumes that the occupant is still partially in the seat otherwise it reverts to empty seat C.O.G.). This creates a "pulse" on the plot of forward displacement versus time in FIG. 6.

Thus, the signature of the crash is a dramatic and extremely fast forward displacement of the combined C.O.G. The signature of the crash also includes a sharp drop-back of the combined C.O.G. that occurs shortly after the forward displacement. Compared to the displacement of the combined C.O.G. due to voluntary movement (FIG. 4), the displacement caused by a vehicle crash (FIG. 6) has marked differences. Specifically, the timing, slope, and amplitude of the "pulse" for the crash are not mimicked in any part of the displacement plot of FIG. 4.

The displacement plot for pre-crash braking (FIG. 5) does have an upward slope, but the slope is not as steep as the slope of the "pulse" in the plot for the crash (FIG. 6). Also, the overall forward displacement of the combined C.O.G. achieved is much further for the crash (FIG. 6) than for pre-crash braking (FIG. 5). Still further, the steep slope on the "pulse" in the plot for the crash (FIG. 6) begins sooner (nearer to time zero) than the steeper portion of the plot for pre-crash braking (FIG. 5). One reason for these differences is that a pre-crash braking deceleration of 1 G or less does not overwhelm the gravity component of C.O.G., as is the case in a crash.

Even further, the duration of the "pulse" in the plot for the crash (FIG. 6) is typically shorter that the duration of the convex bugle (above the maximum voluntary line) in the plot for pre-crash braking (FIG. 5). One reason for such a difference is that pre-crash braking can easily take a second or more in duration while a crash will cause the pulse to be on the order of only 100–150 ms.

Thus, as illustrated by FIGS. 4–6, it is to understood that slope and/or magnitude based threshold tests performed within the C.O.G. crash determination portion 54 of the controller 32 would be sufficient to separate the three cases. Additionally, the height and/or duration of the crash-induced C.O.G. "pulse" in FIG. 6 could also provide a measure of crash severity.

It is to be appreciated that for the sake of simplicity, the above-discussed example was reduced to forward C.O.G. analysis using two weight sensors. It is to be appreciated that rearward C.O.G. analysis is readily obtainable using the illustrated structure. Also, lateral (i.e., right-left) C.O.G. analysis is obtainable using weight sensors places under the left and right portions of the seat. Further, with four separate weight sensors, it would be possible to monitor the motion of the C.O.G. along the fore-to-aft and lateral axes. This would allow a precise measurement of the crash direction (i.e., the crash vector) to allow a differentiation between forward, side, and oblique crashes.

Figure 7:
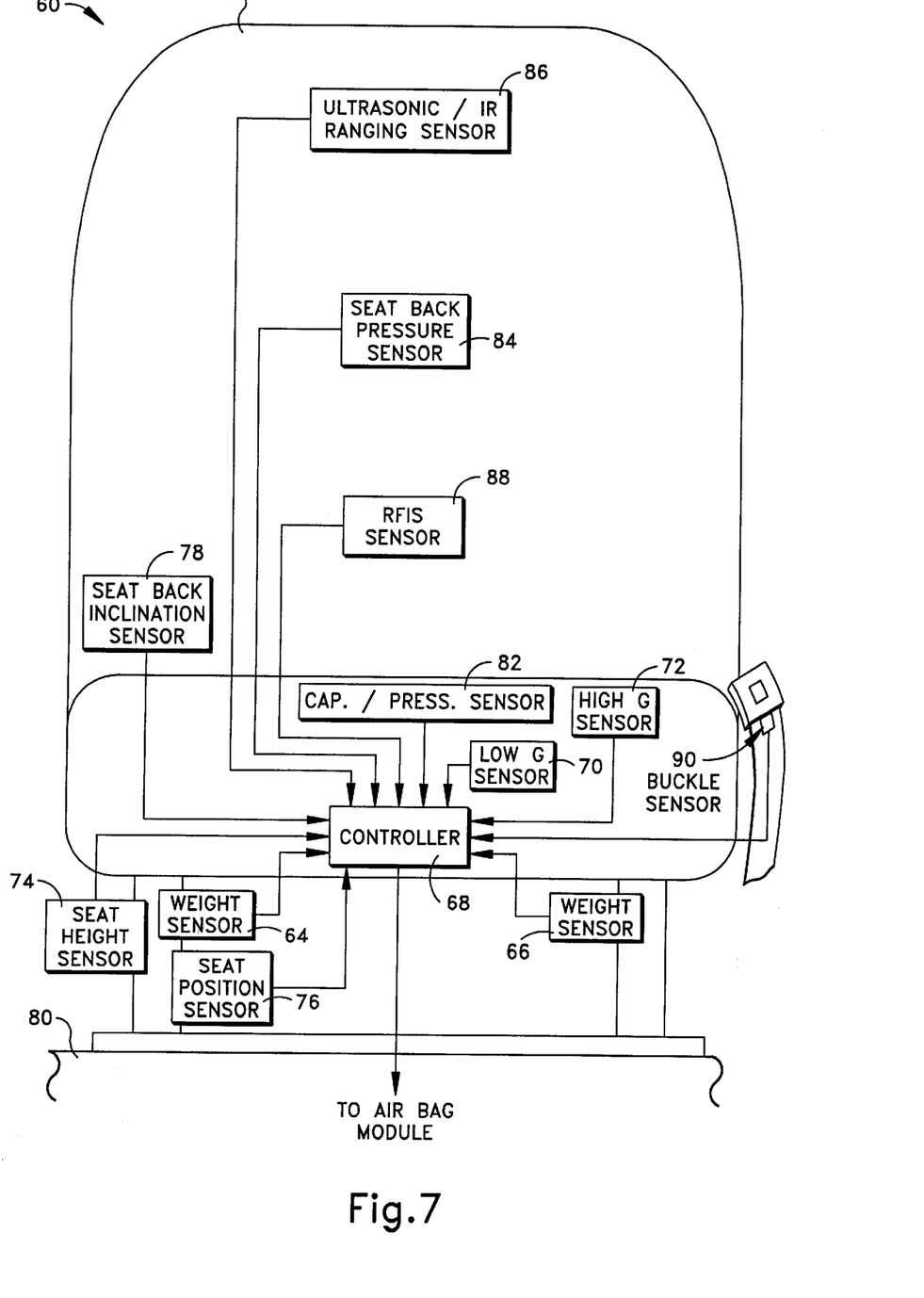
FIG. 7 is a schematic illustration of an arrangement of a second embodiment in accordance with the present invention.

An arrangement 60 that is a second embodiment in accordance with the present invention is shown in FIG. 7. Within the arrangement 60 of the second embodiment, several sensor types are located within a seat 62 to provide a different and/or greater array of information that is used to determine control of an occupant protection device (not shown). Specifically, the arrangement 60 includes a plurality of weight sensors 64 and 66. The weight sensors 64 and 66 provide signals to the controller that indicate weight forces, similar to the first embodiment (FIG. 1). Also, similar to the first embodiment, a controller 68 (FIG. 7) processes the sensory information provided by the weight sensors 64 and 66 to determine change in a combined C.O.G.

The arrangement 60 includes a low G sensor 70 and a high G sensor 72, with each providing a respective signal indicative of vehicle deceleration to the controller 68. Information derived from the sensors 70 and 72 (i.e., vehicle deceleration) is used alone, or in combination with information derived from the weight sensors 64 and 66 (i.e., changes in the combined C.O.G.), to make a determination regarding actuation of the occupant protection device to protect a vehicle occupant (not shown) seated upon the seat 62.

The arrangement 60 includes a plurality of sensors that sense occupant characteristics (e.g., the state of the occupant). The sensed occupant characteristics are used to make determinations regarding modifications of the actuation of the occupant protection device (e.g., actuation suppression, tailoring of the deployment profile, timing, etc.). The sensors includes a seat height sensor 74, a seat position (fore-to-aft) sensor 76, and a seat back inclination sensor 78 to provide sensory information to the controller 68 that indicates the location and orientation of the seat 62, which is movable relative to a vehicle chassis 80. The location and orientation of the seat 62 relative to the chassis 80 is related to the location and orientation of the occupant (not shown) relative to the occupant protection device.

The arrangement also includes an occupant presence sensor 82, in the form of a capacitive or pressure sensor, and a seat back pressure sensor 84. Signals that convey sensory information from the presence and pressure sensors 82 and 84 are provided to the controller 68. The sensory information from the sensors 82 and 84 provides additional crash, braking and motion information, and permits the controller 68 to make determinations regarding occupant size, location, state/type, and whether detected occupant movement is from voluntary movement, braking or a crash. It is to be noted that the presence sensor 82 (e.g., capacitive and/or pressure sensor) may be utilized as part of a seat heater, via the use of a substrate (e.g., a Mylar or Kapton) layer of the presence sensor to deliver energy for heating.

An ultrasonic/infrared (IR) ranging sensor 86 provides a signal indicative of a distance from a seat back to the occupant. A child seat or rearward facing infant seat (RFIS) sensor 88 provides a signal that indicates the presence of a child seat or a RFIS (not shown) on the vehicle seat 62. A buckle sensor 90 is located at a seat belt buckle that is integral with the seat 62, and provides a signal to the controller that indicates seat belt use. These sensory inputs (i.e., from sensors 86–90) to the controller 68 are used by the controller to make determinations regarding control of the occupant protection device.

All of the various sensors (i.e., 64, 66, 70–78, and 82–90) are located within the seat 62. Thus, an automotive manufacturer only has to install the seat 62 and make an appropriate connection (e.g., a wiring connection harness, not shown) to realize an occupant protection benefit. There is no need to install and interface other system components (e.g., no need to install sensors and a controller in a vehicle instrument panel or a vehicle headliner). All of the components (e.g., the controller and the sensors) involved in the actuation control of the occupant protection device are located in within the seat 60. Also, the components are located near to the occupant, thus events (e.g., the experience of force) that occur for the occupant will likely occur for the components.

From the above description of the invention, those skilled in the art will perceive improvements, changes and modifications. It is to be appreciated that additional/different sensors may be utilized. For example, an array of weight sensors may be utilized. A basic example of such a weight sensor array includes the use of two front weight sensors and two rear weight sensors. Determinations regarding movement of the combined C.O.G. would be based upon combinations of plural weight values from appropriate weight sensors. Such improvements, changes and modifications within the skill of the art are intended to be covered by the appended claims.

Having described the invention, the following is claimed:

1. An arrangement for a vehicle having an actuatable occupant protection device, the arrangement comprising:

a vehicle seat for a vehicle occupant;

sensor means located within the seat, the sensor means sensing a characteristic that is dependent upon the occupant of the seat and providing characteristic signals indicative of the sensed characteristic; and processor means located within the seat and operatively connected to the sensor means, the processor means receiving the characteristic signals from the sensor means and using the characteristic signals to determine the occurrence of a vehicle crash condition for which actuation of the occupant protection device is desired, the processor means outputting an actuation signal in response to a determination that actuation of the occupant protection device is desired.

2. The arrangement of claim 1 wherein the sensor means includes first and second weight sensors and the characteristic is a combined weight of the occupant and at least a portion of the seat upon which the occupant is seated.

3. The arrangement of claim 2 wherein the processor means uses the characteristic signals to determine a location of a combined center of gravity of the occupant and at least a portion of the seat, the processor means further including means for monitoring movement of the combined center of gravity for determining whether the movement is indicative of a vehicle crash condition.

4. The arrangement of claim 3 wherein the processor means compares the location of the combined center of gravity to a threshold value and determines the occurrence of a vehicle crash condition when the threshold value is exceeded.

5. The arrangement of claim 3 wherein the processor means determines a rate of change of the location of the center of gravity, the processor means compares the rate of change of the location of the center of gravity to a threshold value and determines the occurrence of a vehicle crash condition when the threshold value is exceeded.

6. The arrangement of claim 1 wherein the processor means receives the characteristic signals at a rate of at least one thousand per second.

7. The arrangement of claim 1 further including means for sensing vehicle deceleration, the means for sensing vehicle deceleration being located within the vehicle seat and being operatively connected to the processor means, the processor means using information derived from the means for sensing vehicle deceleration in combination with the characteristic signals to determine the occurrence of a vehicle crash condition for which actuation of the occupant protection device is desired.

8. The arrangement of claim 1 further including other occupant characteristic sensors, the other occupant characteristic sensors providing occupant state signals, the processor means receiving the occupant state signals and modifying the actuation of the occupant protection device in response to the occupant state signals.

9. The arrangement as set forth in claim 1 further including a seat height sensor located within the seat, the processor means using sensory information from the seat height sensor for controlling the protection device.

10. The arrangement as set forth in claim 1 further including a seat position sensor located within the seat, the processor means using sensory information from the seat position sensor for controlling the protection device.

11. The arrangement as set forth in claim 1 further including a seat back inclination sensor located within the seat, the processor means using sensory information from the seat back inclination sensor for controlling of the protection device.

12. The arrangement as set forth in claim 1 further including a seat back pressure sensor located within the seat, the processor means using sensory information from the seat back pressure sensor for controlling the protection device.

13. The arrangement as set forth in claim 1 further including a ranging sensor located within the seat, the processor means using sensory information from the ranging sensor for controlling the protection device.

14. The arrangement as set forth in claim 1 further including a child seat sensor located within the seat, the processor means using sensory information from the child seat sensor for controlling the protection device.

15. The arrangement as set forth in claim 1 further including a seat belt buckle sensor located within the seat, the processor means using sensory information from the seat belt buckle sensor for controlling the protection device.

* * * * *